Patented Dec. 5, 1933

1,938,087

UNITED STATES PATENT OFFICE 1,938,087

SEPARATION OF HYDROGEN

Mathias Pier, Heidelberg, and Ernst Donath, Mannheim, Germany, assignors, by mesne assignments, to Standard-I. G. Company, Linden, N. J., a corporation of Delaware No Drawing. Application October 11, 1929, Serial No. 399,095, and in Germany November 1, 1928

14 Claims. (Cl. 23—210)

This invention relates to improvements in the separation of hydrogen which expression also comprises gases rich in hydrogen from gaseous mixtures comprising hydrogen.

We have found that hydrogen or gases rich in hydrogen can frequently be separated from gaseous mixtures containing hydrogen, for example industrial gases such as water gas, gases obtained by partial decomposition of gaseous hydrocarbons such as methane, or natural gases, waste gases from destructive hydrogenation processes and the like in a very advantageous manner and without troublesome chemical conversions by washing the gaseous mixtures at elevated temperatures and under increased pressure with a hydrocarbon liquid, having a positive temperature coefficient of solvent power for hydrogen increases with an increase in temperature. It has been found that the solubility of hydrogen in liquids of the said kind at high temperatures is very considerable in comparison with the solubility of the other gases which are usually present in addition to hydrogen in industrial gaseous mixtures, as for example the lower hydrocarbons. If desired hydrogen or gases rich in hydrogen may be readily recovered from the washing liquid after the washing process, preferably by cooling or/and releasing the pressure on the liquid.

Among hydrocarbon liquids, the solvent power of which for hydrogen increases with the temperature, may be mentioned for example tar oils, mineral oils and fractions of the same, the products of the destructive hydrogenation of coal, tars and the like or the products obtained by distillation of the same. The temperature to be employed with tar oils amounts preferably to from 100° to 200° centigrade or more and the pressure amounts to 50 atmospheres or more, if necessary to more than 200 atmospheres, and in every case the pressure should be far more than the vapour pressure of the solvent employed at the temperature in question.

The liquids to be employed as solvents according to the present invention should, as a rule, not be volatile or should be only slightly volatile at the elevated temperature and at the pressure at which the washing is carried out. Thus for example a gas oil having a specific gravity of about 0.840 and boiling at between about 200° and 325° centigrade under ordinary pressure gives excellent results. This gas oil takes up at a temperature of about 300° C. and at a pressure of about 50 atmospheres about 2.7 times as much hydrogen as at 20° C. Under a pressure of 1000 atmospheres the ratio is about 3.2 to 1. On the other hand the solubility of methane in the said gas oil at a temperature of about 300° C. and under a pressure of about 100 atmospheres amounts to only about 62 per cent of the solubility at 20° C.

An advantageous modification of the process in accordance with the present invention consists in the employment of liquid carbonaceous materials such as coal made up into suspensions with oils, or of tars, mineral oils or fractions of these and the like which are to be subjected to destructive hydrogenation, as the washing liquids under such conditions of temperature and pressure that they take up the quantity of hydrogen necessary for the hydrogenation without any appreciable alteration in their chemical nature. It is particularly advantageous in this case to employ the waste gases containing hydrogen and gaseous hydrocarbons obtained by the destructive hydrogenation itself as the gas mixture from which hydrogen is to be separated. In this manner the hydrogen employed for the hydrogenation is used up to a very great extent and, in consequence of its intimate distribution in the washing liquid which is to be hydrogenated, an efficient hydrogenating action is produced.

The following example will further illustrate the nature of this invention, but the invention is not restricted thereto.

*Example*

Waste gases obtained from the destructive hydrogenation of brown coal tar and containing 80 per cent of hydrogen and 20 per cent of methane are washed in a washer which acts on the counter current principle with a middle oil obtained by the destructive hydrogenation itself and at a temperature of 300° centigrade and at a pressure of 200 atmospheres. The throughput of the washer is 100 litres of washing oil and 6,000 litres of waste gases per hour. Under these conditions practically pure hydrogen escapes from the upper end of the washer. If the washing oil which contains hydrogen and methane in the dissolved state is then cooled to 20° centigrade without releasing the pressure a gas mixture is evolved which contains about 90 per cent of hydrogen. Then by releasing the pressure of the cooled oil to atmospheric pressure a gas mixture is obtained which consists of about equal quantities of hydrogen and methane. The washing oil which is now free from gases is again forced into the washer. In this manner the hydrogen which is not utilized for the hydrogenation is recovered in good yields and purified to a great extent.

What we claim is:—

1. A process for the separation of a gas rich in hydrogen from a gaseous mixture comprising hydrogen, which comprises washing the said mixture at an elevated temperature and under an elevated pressure with a hydrocarbon liquid having a positive temperature coefficient of solvent power for hydrogen.

2. A process for the separation of a gas rich in hydrogen from a gaseous mixture comprising hydrogen, which comprises washing the said mixture at an elevated temperature and under an elevated pressure with a hydrocarbon liquid having a positive temperature coefficient of solvent power for hydrogen, and recovering the dissolved hydrogen from the washing liquid.

3. A process for the separation of a gas rich in hydrogen from a gaseous mixture comprising hydrogen, which comprises washing the said mixture at an elevated temperature and under an elevated pressure with a hydrocarbon liquid having a positive temperature coefficient of solvent power for hydrogen, and recovering the dissolved hydrogen from the washing liquid by releasing the pressure thereon.

4. A process for the separation of a gas rich in hydrogen from a gaseous mixture comprising hydrogen, which comprises washing the said mixture at an elevated temperature and under an elevated pressure with a hydrocarbon liquid having a positive temperature coefficient of solvent power for hydrogen and recovering the dissolved hydrogen from the washing liquid by releasing the pressure thereon and cooling.

5. A process for the separation of a gas rich in hydrogen from a gaseous mixture comprising hydrogen, which comprises washing the said mixture at a temperature of between about 100° and 200° C. and at a pressure of between 50 and 200 atmospheres with a hydrocarbon liquid having a positive temperature coefficient of solvent power for hydrogen.

6. A process for the separation of a gas rich in hydrogen from gaseous mixtures containing it, which comprises washing a gas mixture containing about 80 per cent of hydrogen and 20 per cent of methane at a temperature of between about 100° and 200° C. and at a pressure of between 50 and 200 atmospheres with a counter current of a middle oil obtained in the desructive hydrogenation of browncoal tar and recovering the dissolved hydrogen from said middle oil by cooling.

7. A process for the separation of a gas rich in hydrogen from a gaseous mixture comprising hydrogen, which comprises washing the said mixture at an elevated temperature and under an elevated pressure with a hydrocarbon liquid having a positive temperature coefficient of solvent power for hydrogen, and recovering the dissolved hydrogen from the washing liquid by cooling.

8. A process for the separation of a gas rich in hydrogen from a gaseous mixture comprising hydrogen, which comprises washing the said mixture at a temperature of between about 100° and 200° C. and at a pressure of between 50 and 200 atmospheres with a hydrocarbon liquid having a positive temperature coefficient of solvent power for hydrogen and recovering a gas rich in hydrogen from the solution thus obtained by cooling.

9. A process for the separation of a gas rich in hydrogen from a gaseous mixture comprising hydrogen, which comprises washing the said mixture at a temperature of between about 100° and 200° C. and at a pressure of between 50 and 200 atmospheres with a mineral oil and recovering a gas rich in hydrogen from the solution thus obtained by cooling.

10. A process for the separation of a gas rich in hydrogen from a gaseous mixture comprising hydrogen, which comprises washing the said mixture at a temperature of between about 100° and 200° C. and at a pressure of between 50 and 200 atmospheres with a gas oil and recovering a gas rich in hydrogen from the solution thus obtained by cooling.

11. A process for the separation of a gas rich in hydrogen from a gaseous mixture comprising hydrogen, which comprises washing the said mixture at an elevated temperature and under an elevated pressure with an initial material for destructive hydrogenation comprising a hydrocarbon liquid while maintaining conditions at which the said material takes up the quantity of hydrogen necessary for the hydrogenation without any appreciable alteration in its chemical structure.

12. The process of separating hydrogen from gases containing it which comprises washing said gases with a hydrocarbon liquid having a positive temperature co-efficient of solubility for hydrogen, at a temperature of from 100 to 325° C. and a pressure higher than the vapor pressure of said hydrocarbon liquid at the temperature employed.

13. The process as defined in claim 12 including a step of separating the dissolved hydrogen from the hydrocarbon liquid.

14. The process as defined in claim 12 wherein the hydrocarbon liquid is a mineral oil.

MATHIAS PIER.
ERNST DONATH.